(12) United States Patent
Zhou et al.

(10) Patent No.: US 8,096,821 B2
(45) Date of Patent: Jan. 17, 2012

(54) ELECTRICAL CARD CONNECTOR

(75) Inventors: Feng Zhou, Kunshan (CN); Qi-Jun Zhao, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 12/978,642

(22) Filed: Dec. 27, 2010

(65) Prior Publication Data

US 2011/0159716 A1 Jun. 30, 2011

(30) Foreign Application Priority Data

Dec. 26, 2009 (CN) .............................. 2009 2 0318615

(51) Int. Cl.
*H01R 13/62* (2006.01)
(52) U.S. Cl. ...................................................... 439/159
(58) Field of Classification Search .................. 439/159, 439/630, 607.01
See application file for complete search history.

(56) References Cited

U.S. PATENT DOCUMENTS 7,484,976 B2 *  2/2009  Ezaki ............................ 439/159

FOREIGN PATENT DOCUMENTS

TW           M364987        9/2009

* cited by examiner

*Primary Examiner* — Javaid Nasri
(74) *Attorney, Agent, or Firm* — Wei Te Chung; Andrew C. Cheng; Ming Chieh Chang (57) ABSTRACT

An electrical card connector (100) includes a receiving space (10) for receiving an electrical card, an insulative housing (1), a metal plate (3) installed on the insulative housing (1) and an ejecting mechanism (4) retained in the insulative housing (1). The ejecting mechanism (4) includes a movable slider (41), a coiled spring (42) urging the slider forwardly and a link rod (43) for controlling the slider to be positioned at a first position or a second position. The slider (41) includes a heart-shape groove (413) for guiding and limiting a movement of the slider (41). The metal plate (3) defines a pair of first and second retaining portions (31, 32) for limiting movement of the slider (41).

12 Claims, 6 Drawing Sheets

ELECTRICAL CARD CONNECTOR

BACKGROUND OF THE INVENTION

1. Field of the Invention

The present invention relates to an electrical card connector for making an electrical card move into the electrical card connector normally.

2. Description of Related Art

Usually, electrical device such as digital camera and PDA deploys an electrical card for increasing the storage of the device. An electrical card connector is used for connecting the electrical card to the electrical device. Electrical card connector in early stage just comprises an insulative housing, a plurality of terminals retained in the insulative housing for contacting with an electrical card, and a push-push type ejecting mechanism for pushing the electrical card into or out of the electrical card connectors. The ejecting mechanism includes a movable slider moving in the insulative housing, a coiled spring abutting against the slider and a link rod for controlling positions of the slider. The insulative housing defines a fixing slot for fixing a rear end of the link rod. The slider has a heart-shape groove. The heart-shape groove defines a flat bottom wall for the link rod. The link rod clings to the slider and moves on the flat bottom wall. The link rod will deform itself when it moves along the slider. However, while the link rod repeats deformation, the link rod may have excessive deformation. The link rod can not cling to the slider, so the slider may move unsteadily.

Hence, an improved electrical card connector is desired to overcome the above problems.

BRIEF SUMMARY OF THE INVENTION

According to one aspect of the present invention, an electrical card connector, comprises an insulative housing, a plurality of contacts retained in the insulative housing for mating with the electrical card and an ejecting mechanism disposed in the insulative housing. The insulative housing defines a front mating face and a receiving space extending backwardly from the front mating face for receiving an electrical card. The ejecting mechanism includes a movable slider, a coiled spring urging the slider forwardly and a link rod for controlling the slider to be positioned at a first position or a second position farther away from the front mating face than the first position. The electrical card connector further includes a metal plate installed on the insulative housing. The metal plate defines a pair of first and second retaining portions for limiting movement of the slider.

According to another aspect of the present invention, an electrical card connector, comprises an insulative housing, a plurality of contacts received in the insulative housing for engaging with the electrical card and an ejecting mechanism disposed in the insulative housing. The insulative housing defines a front mating face and a receiving space extending backwardly from the front mating face for receiving an electrical card. The ejecting mechanism includes a movable slider, a coiled spring urging the slider forwardly and a link rod for controlling the slider to be positioned at a first position or a second position farther away from the front mating face than the first position. The slider includes a heart-shape groove for guiding and limiting a movement of the slider and a heart-shape block in the middle of the heart-shape groove. The link rod has a central axis extending along a front to rear direction. The heart-shape block includes a first intersection, a second intersection and a third intersection. The first intersection is located at an inner side of the central axis. The second and third intersections are located at an outer side of the central axis. The electrical card connector further includes a metal plate installed on the insulative housing, the metal plate engages with the link rod for limiting movement of the link rod.

Other objects, advantages and novel features of the present invention will become more apparent from the following detailed description of the present embodiment when taken in conjunction with the accompanying drawings.

BRIEF DESCRIPTION OF THE DRAWINGS

FIG. 3 is an exploded view of the electrical card connector shown in

FIG. 1;

DETAILED DESCRIPTION OF THE PREFERRED EMBODIMENTS

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-6, an electrical card connector 100 for receiving an electrical card (not shown), comprises an insulative housing 1, a plurality of contacts 2 retained in the insulative housing 1, a metal plate 3 installed on a rear end of the insulative housing 1, a push-push type ejecting mechanism 4 fixed in the insulative housing 1 and a metal shell 5 covering the insulative housing 1.

Figure 3:
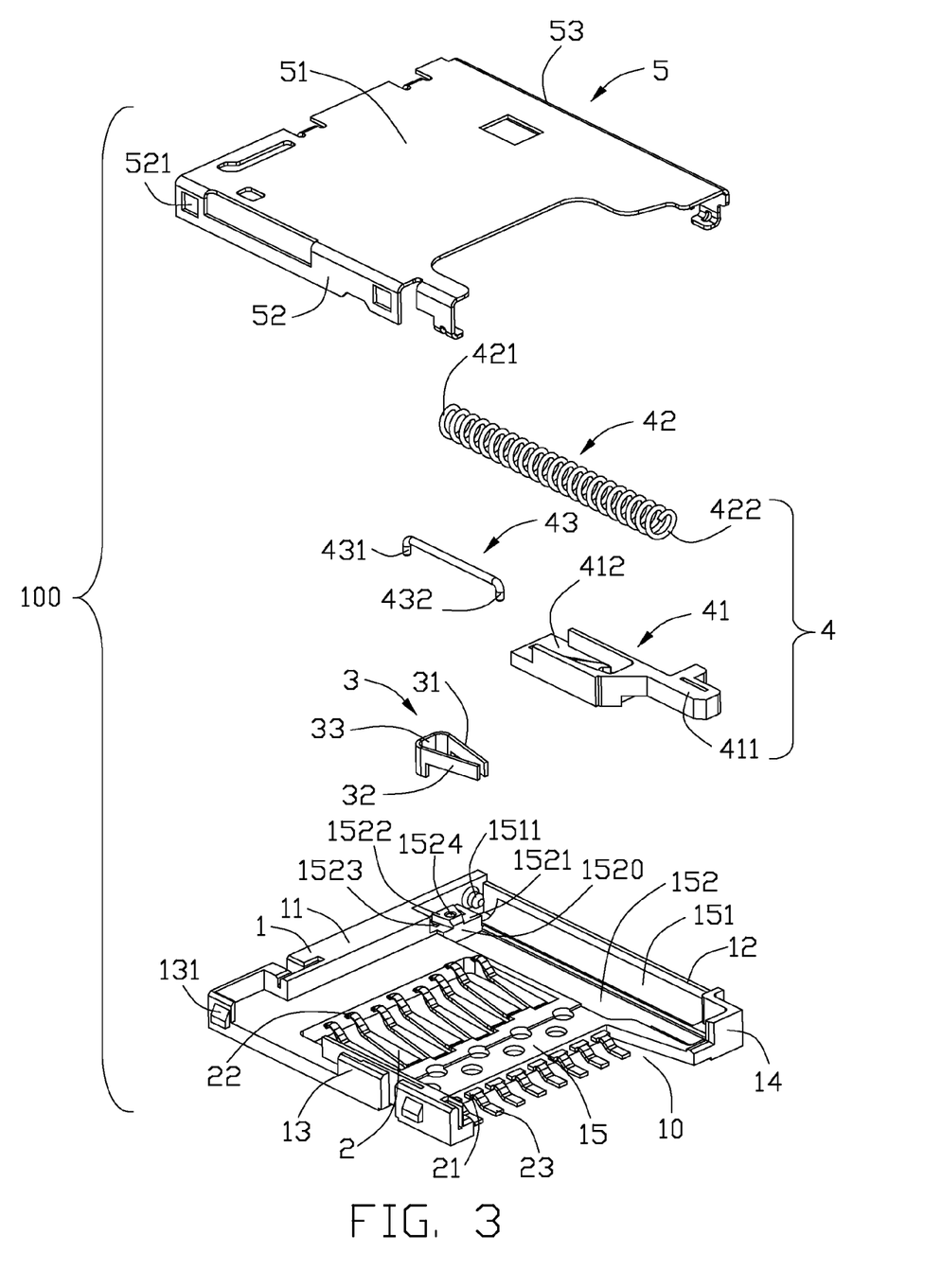

Referring to FIG. 3, the insulative housing 1 has a rear wall 11, a bottom wall 15, a front mating face 14, a receiving space 10 extending backwardly from the front mating face 14 along a front to rear direction for receiving the electrical card and two opposite side walls extending upwardly from two lateral sides of the bottom wall 15. The side walls include a first side wall 12 and a second side wall 13. The first and second side walls 12, 13 define a plurality of protuberances 131 for engaging with the metal shell 5.

Referring to FIG. 3, the bottom wall 15 includes a first slot 151 extending along an front to rear direction and a second slot 152 extending along the front to rear direction. The first slot 151 is adjacent to the first side wall 12. The second slot 152 is adjacent to the first slot 151 and is located at an inner side of the first slot 151. A post 1511 extending along the front to rear direction is located in back of the first slot 151 and is disposed on the rear wall 11. The insulative housing 1 includes a ladder-shaped block 1520 in the wings and a U-shaped slot 1523 next to the ladder-shaped block 1520 for fixing the metal plate 3. The post 1511 is located at an outer side of the ladder-shaped block 1520. The ladder-shaped block 1520 defines a lower portion 1521 and an upper portion 1522 narrower than the lower portion 1521 along a radial direction. The U-shaped slot 1523 defines an opening. The opening faces to the front mating face 14. The upper portion 1522 defines an installing hole 1524 extending from an up to down direction.

Referring to FIG. 3, the contacts 2 are retained in the insulative housing 1 for mating with the electrical card. The contacts 2 are arranged on the insulative housing 1 along a transverse direction. Each contact 2 includes a securing portion 21 installed on the bottom wall 15, a contacting portion 22 protruding from the securing portion 21 backwardly into the receiving space 10 for connecting with the electrical card and a soldering portion 23 extending from the securing portion 21 forwardly for being soldered to a circuit board (not shown). The contacts 2 are unitarily molded with the insulative housing 1 in the present invention for reducing height of the whole electrical card connector 100. Of course, the contacts 2 can be alternatively separated with the insulative housing 1.

Figure 5:
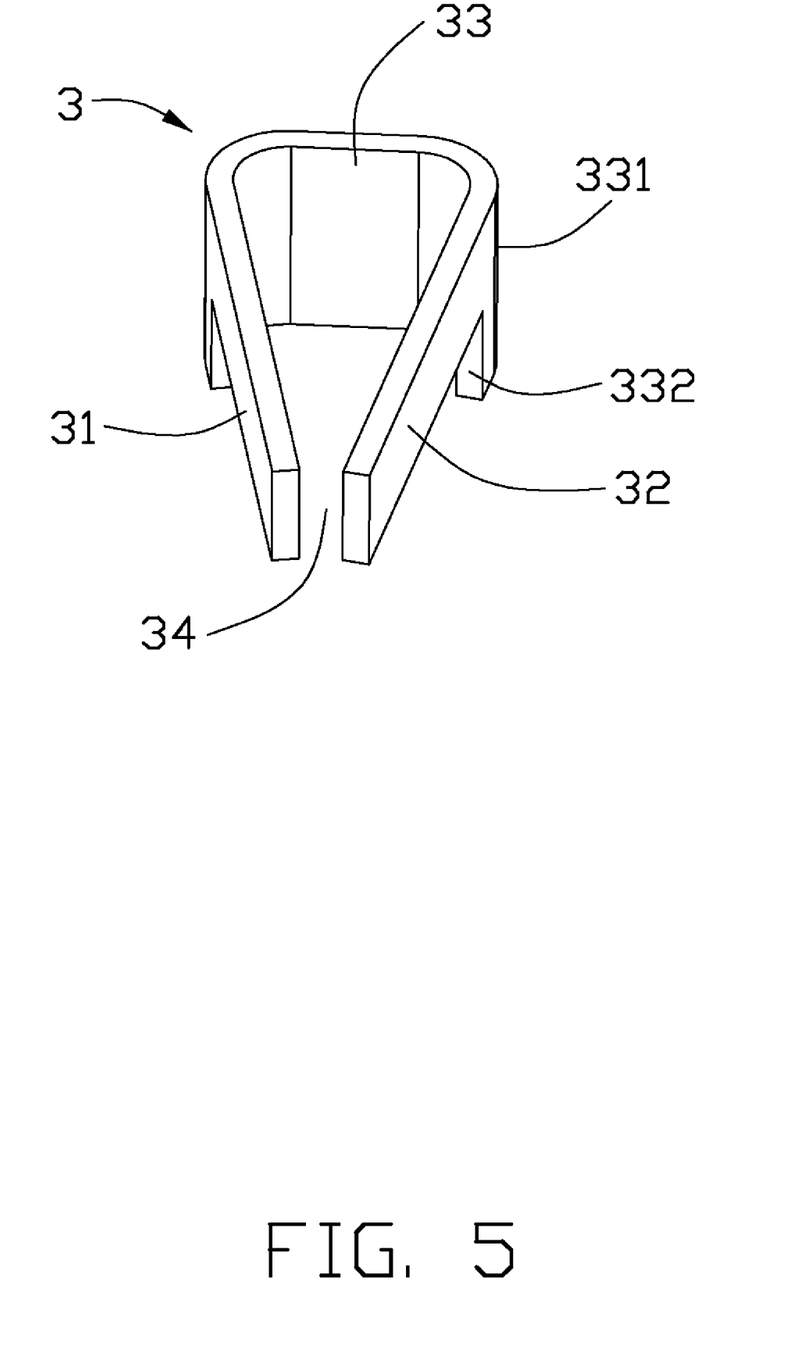
FIG. 5 is a perspective view of a metal plate of the electrical card connector shown in FIG. 1.
Figure 6:
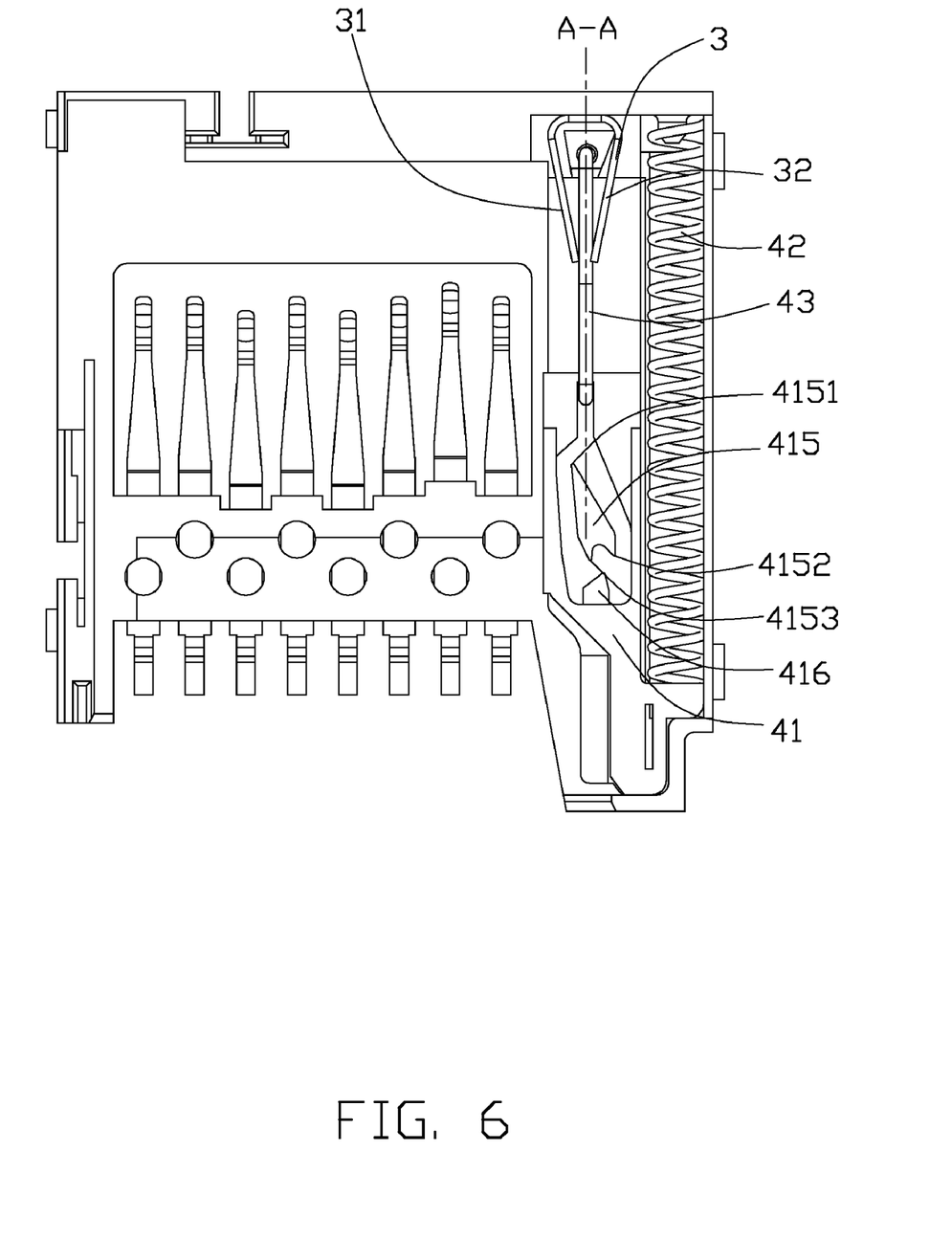
FIG. 6 is a top view of the electrical connector without a shell shown in FIG. 1.

Referring to FIG. 3 and FIG. 5, the metal plate 3 presents as a U-shape frame approximately. The metal plate 3 is installed on the U-shaped slot 1523 of the insulative housing 1. The metal plate 3 includes a first retaining portion 31, a second retaining portion 32 and a main retaining portion 33. The first and second retaining portions 31, 32 define a front end and a rear end respectively. The main retaining portion 33 connects the rear end of the first and second retaining portions 31, 32. The first retaining portion 31 is symmetrical with the second retaining portion 32. The main retaining portion 33 is fixed on the insulative housing 1. The front end of the first retaining portion 31 is disconnected with the front end of the second retaining portion 32. A gap 34 is formed between the front end of the first retaining portion 31 and the front end of the second retaining portion 32. The gap 34 faces the front mating face 14. The main retaining portion 33 and the first and second retaining portions 31, 32 present as an open triangular structure together. The main retaining portion 33 includes a connecting portion 331 connecting the rear end of the first retaining portion 31 and the rear end of the second retaining portion 32 and a fixing portion 332 retained in the U-shaped slot 1523 of the insulative housing 1. The connecting portion 331 abuts against a rear end of the upper portion 1522 from the front to rear direction. The first and second retaining portions 31, 32 are located at two sides of the upper portion 1522. The first and second retaining portions 31, 32 are located at two sides of the installing hole 1524.

Referring to FIG. 3, the push-push type ejecting mechanism 4 is located close to the first side wall 12. The push-push type ejecting mechanism 4 is disposed on the bottom wall 15 of the insulative housing 1. The ejecting mechanism 4 comprises a slider 41 moveably received in the insulative housing 1, a coiled spring 42 having a front end for engaging with the slider 41 and a rear end for abutting against the insulative housing 1 and a link rod 43 for controlling positions of the slider 41. The first and second retaining portions 31, 32 are designed for limiting movement of the slider 41. The first and second retaining portions 31, 32 are located at two sides of the slider 41 respectively. The coiled spring 42 can urge the slider 41 forwardly. The link rod 43 is used for controlling the slider 41 to be positioned at a first position or a second position farther away from the front mating face 14 than the first position. The first position is a start position of the slider 41 before the electrical card being inserted into the electrical card connector 100. The second position is a last position of the slider 41 with the contacts 2 electrically connecting with the electrical card. The coiled spring 42 is received in the first slot 151. The slider 41 moves in the second slot 152.

Figure 4:
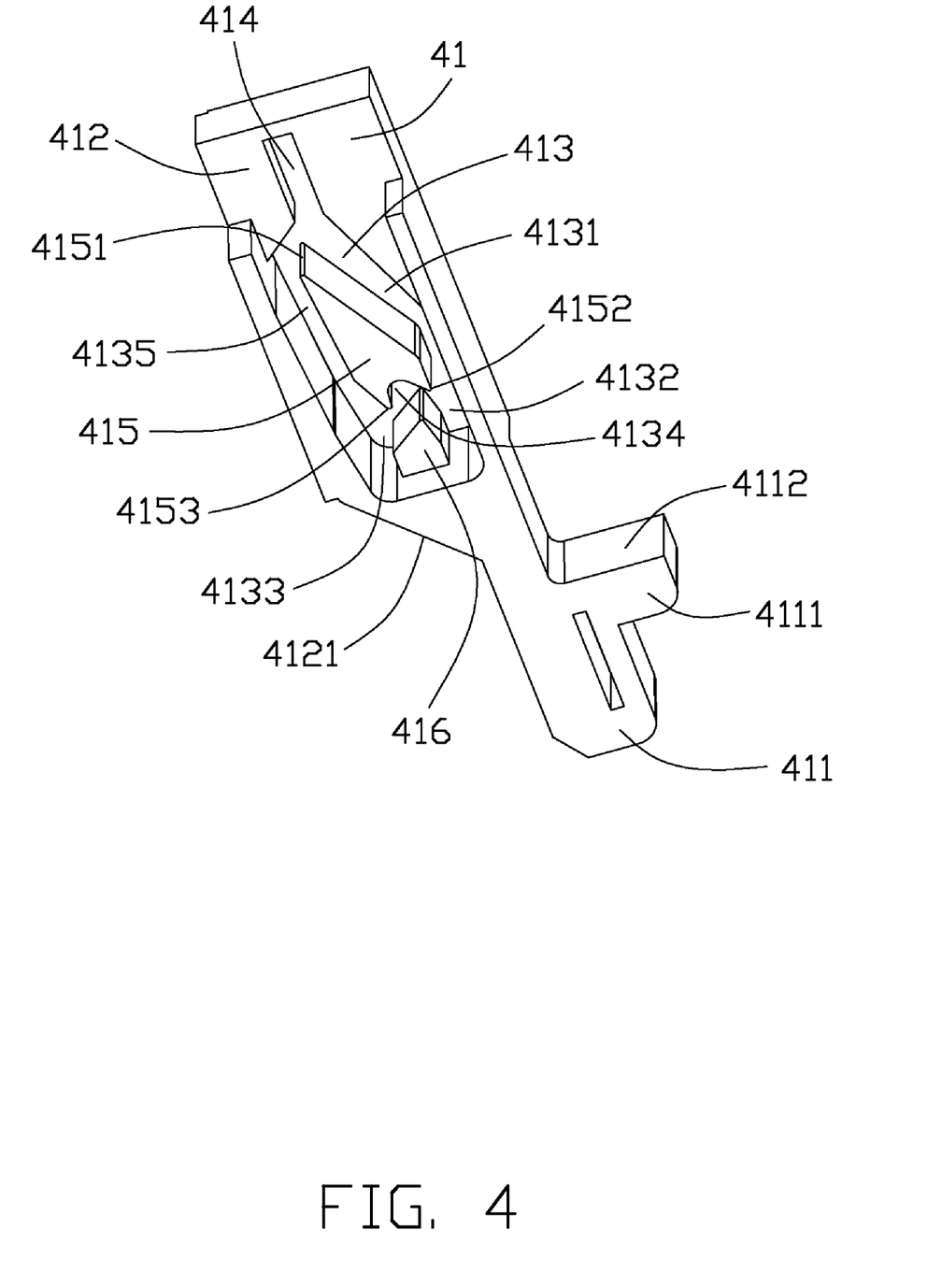
FIG. 4 is a perspective view of a slider of the electrical card connector shown in FIG. 1.

Referring to FIGS. 3-4, the slider 41 includes a main portion 411 extending along the front to rear direction and a protrusion 412 extending from a rear end of the main portion 411 into the receiving space 10 for abutting against a front end of the electrical card. The protrusion 412 slides in the second slot 152. The main portion 411 defines an extending arm 4111 extending outwardly. The extending arm 4111 and the protrusion 412 form a L-shape frame approximately together. The extending arm 4111 has a first engaging face 4112 engaging with the coiled spring 42. The protrusion 412 has a second engaging face 4121 connecting with the main portion 411. The second engaging face 4121 engages with the front end of the electrical card when the card is inserted into the receiving space 10. The slider 41 moves along the front to rear direction recurring to the insertion force of the electrical card.

Referring to FIG. 4, the protrusion 412 includes a heart-shape groove 413 for guiding and limiting a movement of the slider 41, a straight guiding groove 414 located in a rear end of the heart-shape groove 413, a heart-shape block 415 located in the middle of the heart-shape groove 413 and a bulge 416 located in a front end of the heart-shape groove 413. The straight guiding groove 414 is in connection with the heart-shape groove 413.

Referring to FIG. 4, the heart-shape block 415 presents an arc-shape frame in a front end thereof. The heart-shape groove 413 has a first slot 4131, a second slot 4132, a third slot 4135, a fourth slot 4133 and a locking slot 4134. The first and second slots 4131, 4132 connect with each other for guiding the link rod 43 to insert. The third and fourth slots 4135, 4133 connect with each other for guiding the link rod 43 to withdraw. The first, second, third and fourth slots 4131, 4132, 4135, 4133 and the locking slot 4134 connect with each other and form the heart-shape groove 413 together. The first and third slots 4131, 4135 are located at two sides of the heart-shape block 415. The second and fourth slots 4132, 4133 are located at two sides of the bulge 416. The first slot 4131 is longer than the second slot 4132 along the front to rear direction. The third slot 4135 is longer than the fourth slot 4133 along the front to rear direction. The heart-shape groove 413 defines a flat bottom wall, so, the height of the electrical card connector 100 can be decreased.

Referring to FIG. 4, the heart-shape block 415 defines a first intersection 4151 in the wings and a second and a third intersections 4152, 4153 in the front thereof. The second and third intersections 4152, 4153 are located at two sides of the locking slot 4134 respectively. The second intersection 4152 is located farther away from the front mating face 14 than the third intersection 4153. The first intersection 4151 is adjacent to the straight guiding groove 414. The second intersection 4152 is located at an outer side of the locking slot 4134. The second intersection 4152 is adjacent to the second slot 4132. The third intersection 4153 is located at an inner side of the locking slot 4134. The third intersection 4153 is adjacent to the fourth slot 4133.

Figure 1:
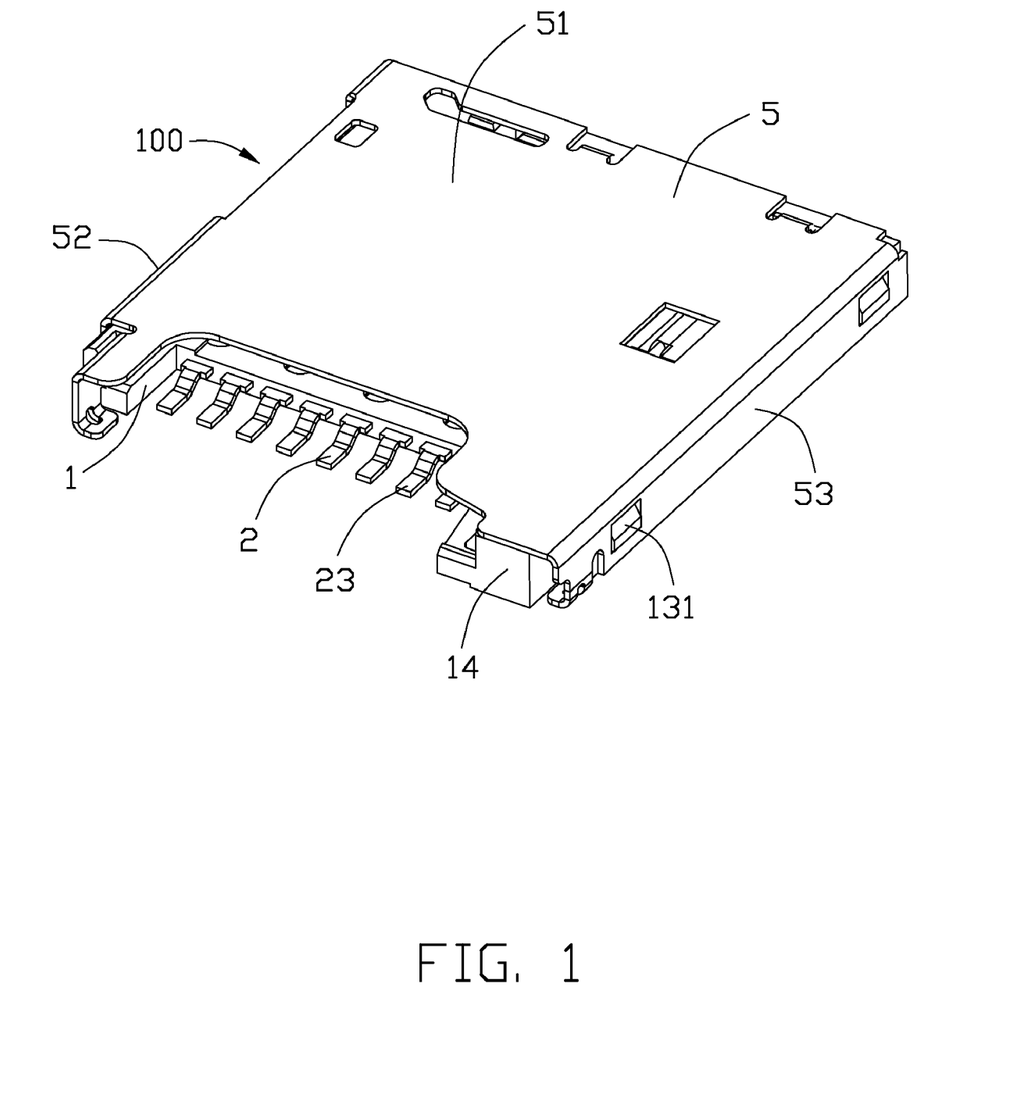
FIG. 1 is a perspective view of an electrical card connector.
Figure 2:
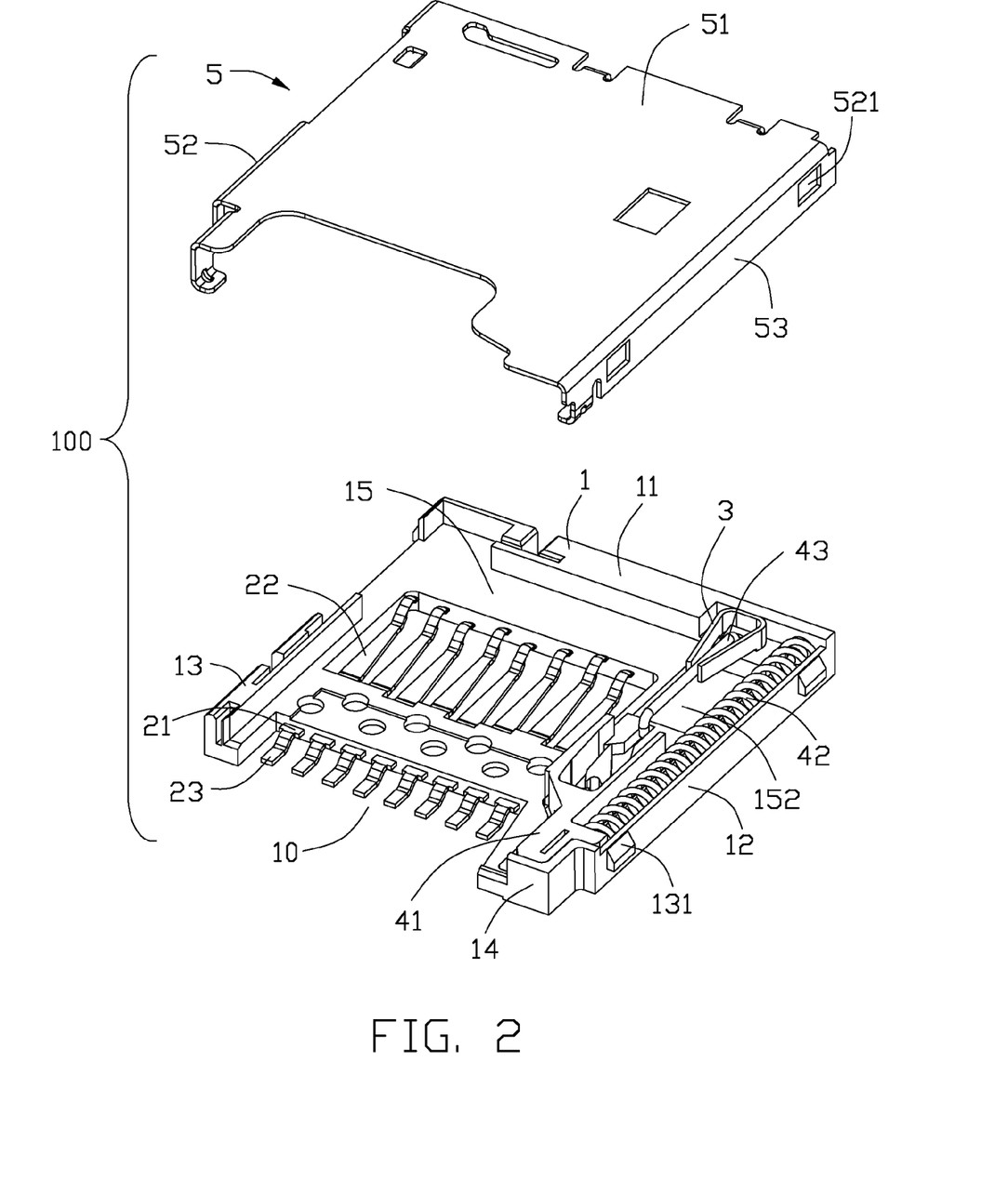
FIG. 2 is a partly exploded view of the electrical card connector shown in FIG. 1.

Referring to FIGS. 2-3, the coiled spring 42 includes a first portion 421 located in the wings and a second portion 422 located in the front thereof. The first portion 421 engages with the post 1511 of the bottom wall 15. The second portion 422 engages with the first engaging face 4112 of the insulative housing 1.

The link rod 43 includes a first part 431 located in the wings and a second part 432 located in the front thereof. The first part 431 is installed in the installing hole 1524 of the insulative housing 1. The second part 432 can move in the heart-shape groove 413 by the electrical card being inserted into the receiving space 10. The link rod 43 turns around the axis of the installing hole 1524. The first and second retaining portions 31, 32 of the metal plate 3 clip the two sides of the link rod 43 respectively for limiting a movement of the link rod 43. The link rod 43 has a central axis A-A extending along the front to rear direction. An extension direction of the central axis A-A is parallel to the moving direction of the slider 41.

The first intersection 4151 is located at an inner side of the central axis A-A. The second and third intersections 4152, 4153 are located at an outer side of the central axis A-A. Under this condition, the link rod 43 can move along the edge of heart-shape block 415. So the link rod 43 moves along a preconcerted movement locus normally.

The slider 41 is located at the first position before the electrical card inserted into the receiving space 10. When the electrical card is inserted into the receiving space 10 normally, the front end of the electrical card pushes the slider 41 moving backwardly along the electrical card insertion direction. Because of the metal plate 3, the link rod 43 can move along the edge of heart-shape block 415. Because of the figure of the heart-shape block 415, the link rod 43 can move along a preconcerted movement locus normally. When the electrical card is pushed backwardly to the second position, the contacts 2 electrically connect with the electrical card. During withdrawing the electrical card, an operator would push the electrical card backwardly, the electrical card is ejected by the ejecting mechanism 4, the slider 41 drives the electrical card move fast from the second position to the first position together. Because of the figure of the heart-shape block 415, the link rod 43 can move along a preconcerted movement locus normally.

The metal shell 5 is made of a piece of metal sheet, and comprises a top wall 51, a first side portion 52 and a second side portion 53. The first and second side portions 52, 53 bend downwardly from two lateral sides of the top wall 51. The first and second side portions 52, 53 include a plurality of through holes 521 for engaging with the protuberance 131 of the insulative housing 1.

It is to be understood, however, that even though numerous characteristics and advantages of the present invention have been set fourth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

What is claimed is:

1. An electrical card connector, comprising:
   an insulative housing defining a front mating face and a receiving space extending backwardly from the front mating face for receiving an electrical card;
   a plurality of contacts retained in the insulative housing for mating with the electrical card; and
   an ejecting mechanism disposed in the insulative housing, the ejecting mechanism including a movable slider, a spring urging the slider forwardly and a link rod for controlling the slider to be positioned at a first position or a second position farther away from the front mating face than the first position;
   wherein the electrical card connector further includes a metal plate installed on the insulative housing, the metal plate defines a pair of first and second retaining portions for limiting movement of the slider;
   wherein the metal plate includes a main retaining portion connecting a rear end of the first retaining portion and a rear end of the second retaining portion, the main retaining portion is fixed on the insulative housing;
   wherein the main retaining portion includes a connecting portion connecting the rear end of the first retaining portion and the rear end of the second retaining portion and a fixing portion retained in a U-shaped slot defined by the insulative housing.

2. The electrical card connector as claimed in claim 1, wherein the first and second retaining portions are located at two sides of the link rod respectively and symmetrically with each other related to the link rod.

3. The electrical card connector as claimed in claim 1, wherein a front end of the first retaining portion is disconnected with a front end of the second retaining portion, a gap facing the front mating face is formed between the front end of the first retaining portion and the front end of the second retaining portion, the main retaining portion and the first and second retaining portions form an open triangular structure together.

4. The electrical card connector as claimed in claim 1, wherein the insulative housing includes a ladder-shaped block, the ladder-shaped block defines a lower portion and an upper portion narrower than the lower portion along a radial direction, the connecting portion abuts against a rear end of the upper portion from a front to rear direction, the first and second retaining portions are located at two sides of the upper portion.

5. The electrical card connector as claimed in claim 4, wherein the upper portion defines an installing hole for installing the link rod, the first and second retaining portions are located at two sides of the installing hole.

6. The electrical card connector as claimed in claim 1, wherein the slider includes a heart-shape groove for guiding and limiting movement of the slider, the heart-shape groove defines a flat bottom wall, the link rod has a central axis extending along a front to rear direction, an extension direction of the central axis is parallel to the moving direction of the slider.

7. The electrical card connector as claimed in claim 6, wherein the slider includes a heart-shape block in a middle thereof, the heart-shape block includes a first intersection, a second and a third intersections in the front thereof, the second intersection is located farther away from the front mating face than the third intersection, the first intersection is located at an inner side of the central axis, the second and third intersections are located at an outer side of the central axis.

8. An electrical card connector, comprising:
   an insulative housing defining a front mating face and a receiving space extending backwardly from the front mating face for receiving an electrical card;
   a plurality of contacts received in the insulative housing for engaging with the electrical card; and
   an ejecting mechanism disposed in the insulative housing, the ejecting mechanism including a movable slider, a coiled spring urging the slider forwardly and a link rod for controlling the slider to be positioned at a first position or a second position farther away from the front mating face than the first position, the slider including a heart-shape groove for guiding and limiting a movement of the slider and a heart-shape block in a middle region of the heart-shape groove, the link rod having a central axis extending along a front to rear direction, the heart-shape block including a first intersection, a second intersection and a third intersection, the first intersection is located at an inner side of the central axis, the second and third intersections are located at an outer side of the central axis;

wherein the electrical card connector further includes a metal plate installed on the insulative housing, the metal plate engages with the link rod for limiting movement of the link rod;

wherein the metal plate defines a pair of first and second retaining portions for limiting movement of the slider, the first and second retaining portions are located at two sides of the link rod respectively and are symmetrical with each other related to the link rod;

wherein the metal plate includes a main retaining portion connecting a rear end of the first and a rear end of the second retaining portions, the main retaining portion is retained in a fixing hole in the insulative housing.

9. The electrical card connector as claimed in claim 8, wherein the first intersection is located in the housing, the second and third intersections are located in the front thereof, the second intersection is located farther away from the front mating face than the third intersection, the heart-shape groove defines a locking slot.

10. The electrical card connector as claimed in claim 8, wherein the insulative housing includes a ladder-shaped block, the ladder-shaped block defines a lower portion and an upper portion narrower than the lower portion along a radial direction, the main retaining portion abuts against rear end of the upper portion from a front to rear direction, the first and second retaining portions are located at two sides of the upper portion.

11. The electrical card connector as claimed in claim 8, wherein a front end of the first retaining portion is disconnected with a front end of the second retaining portion, a gap facing the front mating face is formed between the front end of the first retaining portion and the front end of the second retaining portion, the main retaining portion connects the first and second retaining portions to form an open triangular structure.

12. An electrical card connector comprising:
an insulative housing defining a card receiving space therein;
a plurality of contacts disposed in the housing with contacting sections extending into the card receiving space;
an ejection mechanism located beside the card receiving space and including a slider back and forth moveable along a front-to-back direction generally between opposite inner and outer positions, a link rod with one end moveable along a groove structure cyclically under condition said groove structure extends in both said front-to-back direction and a transverse direction perpendicular to said front-to-back direction, wherein
said ejection mechanism further includes a biasing device constantly urging the slider toward the outer position along an axis defined by said front-to-back direction, and a metal plate constantly urging a body of said link rod in the transverse direction toward a transversal neutral position wherever said end of the link rod is moved in said groove structure; wherein
the groove structure spans within a range in said transverse direction so as to have the link rod experiences opposite transverse urging forces at different stages cyclically; wherein
said groove structure is unitarily associated within the slider, and said link rod defines another end pivotally secured to a fixed position relative to the housing; wherein
said metal plate constantly provides urging forces upon two sides of the body of the link rod at least when the link rod is deviated beyond an amount relative to the axis defined by said front-to-back direction; wherein
no stepped structures are formed in the groove structure; wherein
said metal plate having a pair of first and second retaining portions intimately located at two sides of the link rod respectively, and a rear end of the first retaining portion and a rear end of the second retaining portion being essentially immovable with regard to the housing for retaining the metal plate with regard to the housing while a front end of the first retaining portion and a front end of the second retaining portion being transversely moveable with the link rod for providing restoration force upon the link rod back to the transversal neutral positio.

\* \* \* \* \*